United States Patent
O'Brien et al.

(10) Patent No.: US 7,212,935 B1
(45) Date of Patent: May 1, 2007

(54) METHOD FOR IN-SYSTEM AUTO ZEROING OF A TORQUE SENSOR IN AN AUTOMATIC TRANSMISSION DRIVE TRAIN

(75) Inventors: Gary R. O'Brien, Riverview, MI (US); George Edward Bown, Oxford (GB)

(73) Assignee: Honeywell International, Inc., Morriston, NJ (US)

( * ) Notice: Subject to any disclaimer, the term of this patent is extended or adjusted under 35 U.S.C. 154(b) by 0 days.

(21) Appl. No.: 11/314,677

(22) Filed: Dec. 21, 2005

(51) Int. Cl.
*G60K 28/16* (2006.01)

(52) U.S. Cl. .......................... 702/87; 701/84; 701/87; 701/90; 180/197; 477/110

(58) Field of Classification Search ................. 702/87; 477/83, 110, 111, 162; 701/69, 101, 84, 701/87–90; 180/65.6, 65.2, 197; 340/441
See application file for complete search history.

(56) References Cited

U.S. PATENT DOCUMENTS

| | | | |
|---|---|---|---|
| 4,220,058 A | 9/1980 | Petzold | 74/751 |
| 5,169,365 A * | 12/1992 | Friedmann | 474/18 |
| 6,827,167 B2 * | 12/2004 | Cikanek et al. | 180/65.6 |
| 2003/0183431 A1 * | 10/2003 | Cikanek et al. | 180/65.6 |
| 2004/0064233 A1 * | 4/2004 | Iida | 701/69 |
| 2005/0101435 A1 * | 5/2005 | Cowan | 477/83 |

OTHER PUBLICATIONS

Jurgen, Ronald K. *Automotive Electronics Handook*, McGraw-Hill, Inc., 2nd ed., pp. 9.1-7. 1999.

* cited by examiner

*Primary Examiner*—John Barlow
*Assistant Examiner*—Hien Vo
(74) *Attorney, Agent, or Firm*—Richard S. Roberts

(57) ABSTRACT

The invention relates to torque sensors or more particularly to automotive torque sensors which measure the torque transmitted at one or more positions within an automotive power train. The invention provides a method for zeroing an automotive power train torque sensor while a vehicle is moving during the zero torque condition.

24 Claims, 3 Drawing Sheets

METHOD FOR IN-SYSTEM AUTO ZEROING OF A TORQUE SENSOR IN AN AUTOMATIC TRANSMISSION DRIVE TRAIN

BACKGROUND OF THE INVENTION

1. Field of the Invention

The present invention relates to torque sensors, or more particularly to automotive torque sensors which measure a torque value at a point within the vehicle power train. The invention provides a method for zeroing an automotive power train torque sensor while a vehicle is moving during the essentially zero torque condition.

2. Description of the Related Art

Automotive power train control systems today use inferred torque measurement to provide critical input to a wide variety of control systems. There has long been a desire to measure engine and or transmission torque in a direct manner to improve the accuracy of the torque signal and thus provide improved engine and transmission control, for example, shift quality, gear ratio change, and speed ratio. This is typically accomplished by a mechanical control valve mechanism for modifying the pressure applied to various friction elements in the transmission and to selectively hold and release different components of a planetary gear set. The shift quality should be optimized in order to achieve a smooth transition from an original engine speed to a new engine speed. In general, it is not desirable to have a shift of very brief duration, as this produces a jerk by the rapid change in vehicle acceleration, which is very noticeable and found objectionable by most drivers. On the other hand, if the shift time is stretched out for too long a period, undue wear is imposed on the friction elements of the transmission.

It is known in the art to control power train smoothness using output torque sensing and input torque control. In this regard, see U.S. Pat. No. 4,220,058 and U.S. patent application US2005/0101435A1. An automotive power train typically has an engine, automatic transmission, multiple-ratio gearing controlled by friction elements actuated by hydraulic pressure, an output shaft torque sensor producing a signal representing the magnitude of current output torque, an electronic controller for controlling the target output torque based on the current output torque, increasing the torque capacity of the oncoming friction element and decreasing the torque capacity of the off-going friction element after a gear ratio change is initiated. During the inertia phase of the ratio change, the controller controls the engine speed to follow a predetermined rate of change of input speed. The strategy employs an electronic throttle and closed loop engine torque control and closed loop engine speed control at various phases of the gear shift, to improve shift feel. Various engine parameters, including throttle position, ignition timing, engine air-fuel ratio, and engine airflow, control engine torque and speed, are used to control input torque or input speed, depending on the shift phase.

One of the problems with on-board torque sensors is that they experience zero offset drift over the life of the vehicle. There are many components of this drift including inherent drift mechanisms in the sensor itself as well as drift mechanisms in the mechanical system that connects the source of torque, for example the engine, to the point at which the sensor is mounted in the drive train, for example the torque converter, on a transmission, on a transmission output shaft, or a differential.

It has been determined that because the various control algorithms that use the torque signal often require accurate torque measurement near the zero level, this offset drift error must be minimized. Performing a one time zeroing of the torque sensor during the production of the vehicle would not be sufficient since drift will occur as the vehicle is driven. Contributors to this drift may include temperature change, vibration, mechanical misalignment and mechanical wear of moving parts. As long as these contributors are slow changing then the methods of in-system zeroing discussed herein will be effective.

There are two main requirements that must be met in order to perform an in-system zeroing of the torque sensor. There must be a zero torque condition in the mechanical system that the torque sensor measures, and the calibration event must be transparent to the driver. This invention provides a method for using various monitored conditions of vehicle operation to determine when a near zero torque condition exists in a moving vehicle. Once this condition is determined, zeroing the sensor is done in such a way that is not noticeable to the driver. The method of zeroing is done by reading the zero torque value of the sensor output and storing it into non-volatile memory for subsequent subtraction from future torque readings. One method of creating a zero torque condition in the drive train, would be for the vehicle's transmission controller to briefly shift the transmission into neutral, read the torque sensor output, and then shift back into the proper gear. If this operation is done when the vehicle drive train is in a near zero torque condition, then the driver will not feel the calibration event. On the contrary, if this calibration event were performed when the driver is accelerating the vehicle, then the driver would experience a noticeable and unacceptable drop in power.

SUMMARY OF THE INVENTION

The invention provides a method for zeroing a vehicle power train torque sensor which comprises:

a) providing a vehicle having a power train including an engine and/or a transmission, and a torque sensor connected at a position along the power train which torque sensor measures the torque transmitted at that position in the power train;

b) determining when a zero or near zero torque condition exists at the engine output and/or within the power train while the vehicle is moving;

c) determining a torque value with the torque sensor while the vehicle is moving during the zero torque condition, and storing the determined torque value in a memory; and d) determining a second torque value with the torque sensor while the vehicle is moving, and adjusting the second torque value by an amount of torque value determined from step (c).

The invention also provides a device for zeroing a vehicle power train torque sensor which comprises:

a) a torque sensor which measures torque transmitted at a position along a vehicle power train;

b) an apparatus for determining when a zero or near zero torque condition exists in the power train while the vehicle is moving;

c) an instrument for determining a torque value with the torque sensor while the vehicle is moving during the zero torque condition, and storing the determined torque value in a memory; and d) an appliance for determining a second torque value with the torque sensor while the vehicle is moving, and adjusting the second torque value by an amount of torque value determined from the instrument.

The invention further provides a vehicle which comprises a power train including an engine and a transmission connected to the engine; and a device for zeroing a vehicle power train torque sensor which device comprises:

a) a torque sensor which measures torque transmitted at a position along a vehicle power train;
b) an apparatus for determining when a zero or near zero torque condition exists in the power train while the vehicle is moving;
c) an instrument for determining a torque value with the torque sensor while the vehicle is moving during the zero torque condition, and storing the determined torque value in a memory; and
d) an appliance for determining a second torque value with the torque sensor while the vehicle is moving, and adjusting the second torque value by an amount of torque value determined from the instrument.

DESCRIPTION OF THE INVENTION

Figure 1:
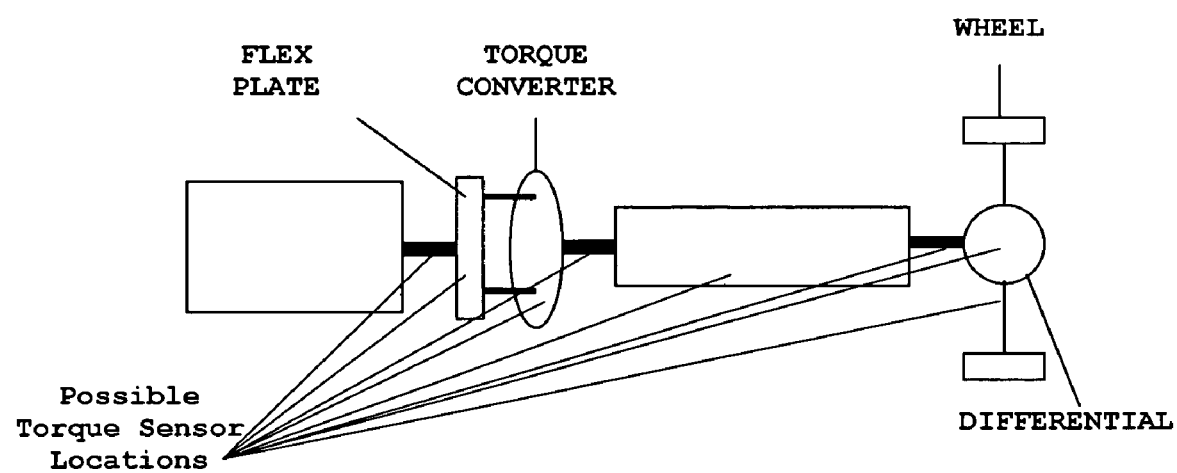
FIG. 1 shows a schematic of an automobile drive train and some of the possible locations for a torque sensor within the drive train.

The device for zeroing a power train torque sensor is first composed of a torque sensor which measures a torque output from a power train. For purposes of this invention, the power train of a vehicle are those portions of a vehicle extending from the engine to the wheels including the engine and the wheels. The sensor could be placed anywhere from the engine and the wheels to measure the torque used to propel the vehicle. FIG. 1 shows some of the possible locations for the torque sensor within the power train. Such may be positioned, for example on or after an engine crankshaft, flex plate, on or after a torque converter, or a transmission drive shaft. When the torque sensor is connected to the engine of the vehicle the torque value out of the engine is determined. When the torque sensor is connected to flex plate, on or after a torque converter, transmission or differential, torque at those specific positions in the power train is measured.

Rotary torque sensors are well known in the art. One commercially available technology for the transmission output torque sensor uses strain gauges and slip rings on the output shafts. In one embodiment, non-contacting systems detect magnetic field alignment changes as a technique to measure and provide a signal proportional to shaft torque, such as the system described in SAE Paper 2003-01-0711, the 'Torductor' System provided by ABB Automation Products AB, Vasteras, Sweden. Magna-lastic Devices, Inc. provides a similar system. Another torque-sensing technology involves Surface Acoustic Wave (SAW) sensing systems. Rotary strain gage torque sensors are commercially available from Honeywell Sensotec of Columbus, Ohio, 43228 USA. An apparatus is then employed for determining when a zero or near zero torque condition exists in the power train while the vehicle is moving. Such an apparatus is typically a microprocessor which integrates data from sensors which monitor automobile operating conditions. There are a variety of sensors and methods that could be used to determine when a near zero torque condition is present in the vehicle and when a short shift to neutral would go unnoticed. Modern automobiles contain many monitors and condition sensors and these rely on various monitored conditions of the vehicle operation as inputs. Some of these conditions could include, but are not limited to, vehicle speed, throttle position, brake position, transmission speed, engine speed, and torque sensor output. The first derivative of these conditions may also be useful as inputs to the decision function. The apparatus selects from these conditions monitored conditions and determines when a zero or near zero torque condition exists in the power train while the vehicle is moving. A suitable instrument, such as a different microprocessor or another portion of the same as the above-mentioned apparatus, then determines, preferably automatically determines, a torque value with the torque sensor while the vehicle is moving during the zero torque condition, and stores the determined torque value in a memory such as a non-volatile memory. A sensing appliance, which may be a separate microprocessor, or another portion of the above-mentioned apparatus or instrument then determines, preferably automatically determines, a second torque value with the torque sensor while the vehicle is moving during a potentially non-zero torque condition, and numerically adjusts the second torque value by an amount of torque value determined from the instrument. Within the context of this invention, the term "automatically" means without deliberate driver intervention.

Figure 2:
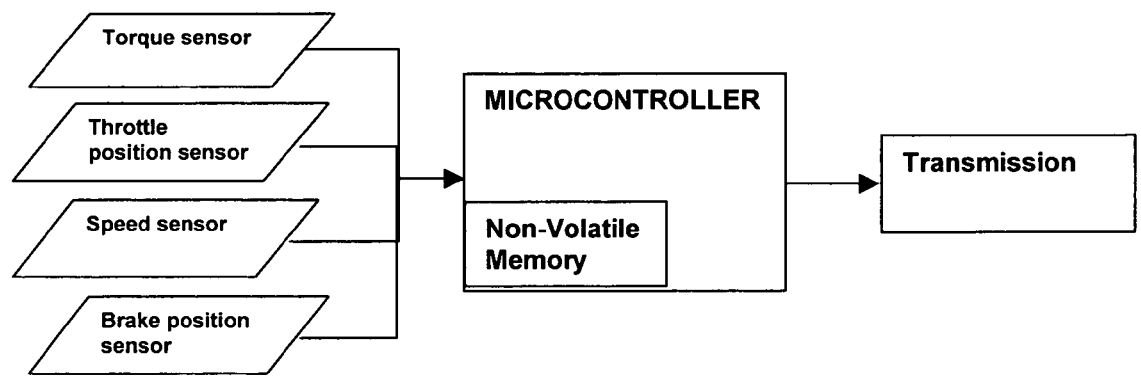
FIG. 2 shows a schematic of data handling from sensors through application to an automobile transmission.

In order to illustrate how various vehicle operating conditions could be used to determine if it is an appropriate time to perform a calibration of the torque sensor, somewhat self explanatory linguistic variables can be used to classify the various states of each input. FIG. 2 shows a schematic of data handling from sensors through application to an automobile transmission. Data from a torque sensor, throttle position sensor, speed sensor and brake position sensor are integrated into a microcontroller comprising a microprocessor. Data from these sensors perform the necessary calculations to determine which a zero or near zero torque condition exists in the power train while the vehicle is moving. A torque value is then determined, preferably automatically determined, with the torque sensor while the vehicle is moving during the zero torque condition, and the determined torque value is then stored in a non-volatile memory. A second torque value is then determined, preferably automatically determined, with the torque sensor while the vehicle is moving during the potentially non-zero torque condition and the second torque value is then adjusted by an amount of the first torque value determined. A Fuzzy Logic approach using inference rules can then be formed using these variables to demonstrate how the final decision is generally related to the inputs. Fuzzy logic set theory provides a formalism in which the conventional binary logic based on choices "yes" and "no" is replaced with a continuum of possibilities that effectively embody the alternative "maybe". It is a system of logic dealing with the concept of partial truth with values ranging between "completely true" and "completely false." Fuzzy logic is designed for situations where information is inexact and traditional digital on/off decisions are not possible. It is a form of artificial intelligence where a conclusion is reached by a computer recognizing that all values are not absolutes such as yes or no, black or white etc. Fuzzy logic makes calculations considering values in varying degrees between absolutes. For example, a computer might recognize black and white as absolutes, yet make an evaluation based on a shade of gray, which is somewhere between. Other methods of inferring the appropriate time to perform zeroing could be used.

Figure 3:
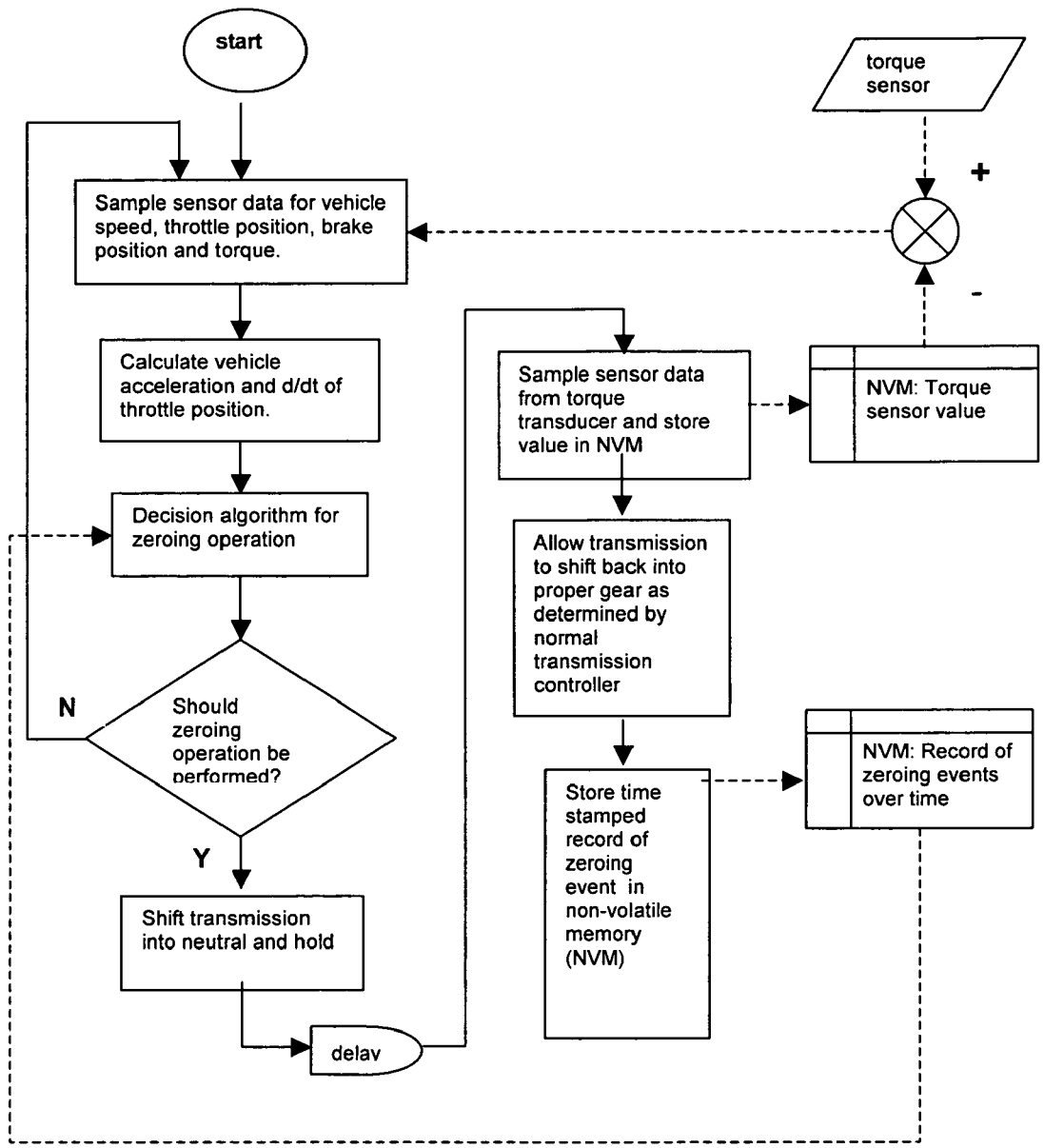
FIG. 3 shows a flow chart of a zeroing operation.

FIG. 3 shows a flow chart of a typical zeroing operation. The dashed lines denote data flow. They do not represent any sequential flow as is the case with the solid lines. In the procedure shown, one first samples sensor data for vehicle speed, throttle position, brake position and a first torque sensor value. Then calculate vehicle acceleration and d/dt of throttle position. A decision algorithm for a zeroing operation is then applied. A decision point is reach where the question is asked whether a zeroing operation should be performed. If no, return to the sensing operation step. If yes, shift the transmission into neutral and hold for a brief delay period. Sample sensor data from the torque transducer and store value in a non-volatile memory (NVM). Obtain a second torque sensor value at this point and adjust the first torque sensor value up or down. Then allow the transmission to shift back into proper gear as determined by the normal transmission controller operation. Then store the time stamped record of zeroing event in the non-volatile memory (NVM). Then record zeroing events over time, and return to the application of the decision algorithm. Those skilled in the art may vary the decision parameters as desired. In another embodiment of the invention, step (d) in the method above may be repeated. In another embodiment of the invention, steps (b), (c) and (d) in the method above may be repeated.

Table 1 shows a list of suitable input and output linguistic variables along with typical terms for each. Data from the vehicle monitoring systems would be mapped to varying degrees of the terms of each variable using membership functions. For example, a vehicle speed of 55 MPH may be mapped to a high degree of 'Cruising' and a low degree of 'Low' and 'High' If the degree ranged from 0 to 1 then the result would be: Vehicle Speed(55)={Cruising 1, Low 0, High 0}.

TABLE 1

| Linguistic Variables | Possible Values (Terms) |
|---|---|
| Inputs | |
| Vehicle Speed | Cruising, Low, High |
| Acceleration (d/dt of vehicle speed) | Near Zero, Slightly Positive, Slightly Negative, Very Positive |
| Throttle Position | Idle |
| d/dt Throttle Position | Positive, Low, Negative |
| Brake Position | On, Off |
| Torque Sensor Output | Low |
| Output | |
| Perform Zeroing | Strong Yes, Yes, No, Absolute No |

Linguistic variables and their associated terms are then used in inference rules to determine when to perform the zeroing. A set of possible rules is shown in Table 2. The degree to which each monitored variable meets the terms in the rule results in a set of values that are then operated on by the AND function to determine a resultant degree of the output variable according to its term. The AND function in this case is not a Boolean AND, but rather a MIN function. Each output variable term is characterized by its typical value in the output space as determined by a membership function. Various methods are used on the output terms into reach a final decision of whether or not to perform the zeroing. This example will assume that the Center of Maximum (CoM) method is used to combine each rule output value to determine the final answer. The CoM method arrives at the final answer by first multiplying each rule output value by its corresponding output variable term's typical value. The sum of these products from each rule is then mapped to the final decision space for the binary decision of yes or no. In this example $x<=0$ maps to 'no' whereas $x>0$ maps to 'yes' as the final answer to the question of whether or not it is the appropriate time to perform the zeroing.

TABLE 2

| | IF variable1(term) AND variable2(term) THEN | | | | | OUTPUT |
|---|---|---|---|---|---|---|
| | Vehicle Speed | Acceleration | Throttle Position | d/dt Throttle Position | Brake Position | Torque Sensor Output | (term) Perform Zeroing |
| 1 | Cruising | Near Zero | Idle | Low | Off | x | Strong Yes |
| 2 | Cruising | Near Zero | Idle | Low | Off | Low | Yes |
| 3 | Cruising | Slightly Negative | $x^1$ | Negative | Off | Low | Yes |
| 4 | x | Slightly Positive | Idle | Low | Off | Low | Yes |
| 5 | x | Very Positive | X | x | x | x | Absolute No |
| 6 | Low, High | x | X | x | x | x | No |
| 7 | x | x | X | Positive | x | x | Absolute No |

$x^1$ = don't care condition, not used in rule

Tables 3 and 4 illustrate the decision process for a given set of operating parameters for the vehicle. This condition represents a situation in which a vehicle is cruising at the high end of highway speeds and the driver is reducing the throttle position resulting in a slow reduction in speed. Each term column in Table 3 shows how the actual condition value is mapped into varying degrees of each term (0=min, 1=max). Membership functions for each input variable that would describe the mapping of real world data to the terms on a scale of 0 to 1. The last column of Table 3 shows the degree (0=min, 1=max) of each rule's output variable term that is calculated given this set of vehicle conditions. The "Perform Zeroing" variable values for each rule are carried over into Table 4 where they multiply each rule output with the typical value for the corresponding "Perform Zeroing" term. The sum of products is then taken and the final result of 0.19 maps into the final answer of 'yes'. In this example, each rule is given equal weight in the final decision. In practice these rules could be scaled to make some more forceful than others. This example arrives at the correct answer to perform the zeroing since the driver would not notice the shift to neutral in this condition.

TABLE 3

| Variable | Vehicle Speed | Acceleration | Throttle Position | d/dt Throttle Position | Brake Position | Torque Sensor Output | Perform Zeroing |
|---|---|---|---|---|---|---|---|
| Actual Value | 70 mph | −0.1 mph/s | 20% FS | −30% FS/s | 0% FS | 50 Nm | |
| Rule 1 | Cruising = .8 | Near Zero = .85 | Idle = .1 | Low = .2 | Off = 1 | x | Strong Yes = 0.1 |
| Rule 2 | Cruising = .8 | Near Zero = .85 | Idle = .1 | Low = .2 | Off = 1 | Low = 0.6 | Yes = 0.1 |
| Rule 3 | Cruising = .8 | Slightly Negative = 0.7 | x | Negative = 1 | Off = 1 | Low = 0.6 | Yes = 0.6 |
| Rule 4 | x | Slightly Positive = 0 | Idle = .1 | Low = .2 | Off = 1 | Low = 0.6 | Yes = 0 |
| Rule 5 | x | Very Positive = 0 | x | x | x | x | Absolute No = 0 |
| Rule 6 | Low = 0, High = 0.4 | x | x | x | x | x | No = 0.4 |
| Rule 7 | x | x | x | Positive = 0 | x | x | Absolute No = 0 |

TABLE 4

| | Perform Zero | | | |
|---|---|---|---|---|
| Variable Terms of "Perform Zero" | Strong Yes | Yes | No | Absolute No |
| Typical Value of Term | 0.8 | 0.5 | −0.6 | −1 |
| Rule 1 Output Times Typical Value of Term | 0.08 | | | |
| Rule 2 Output Times Typical Value of Term | | 0.05 | | |
| Rule 3 Output Times Typical Value of Term | | 0.3 | | |
| Rule 4 Output Times Typical Value of Term | | 0 | | |
| Rule 5 Output Times Typical Value of Term | | | | 0 |
| Rule 6 Output Times Typical Value of Term | | | −0.24 | |
| Rule 7 Output Times Typical Value of Term | | | | 0 |
| Weighted Sums for Each Term | 0.08 | 0.35 | −0.24 | 0 |
| Resultant CoM | 0.19 | | | |
| Zeroing Final Decision (No: <=0, Yes >0) | YES | | | |

An examination of the rules in Table 2 reveals several generalities of this decision process. Notice that the brake position variable can single handedly dominate the final decision to a no if the brake is 'On'. Here, if the vehicle is braking, then the driver may want the extra load of the transmission as an assist. There also may be a load on the torque sensor during braking which would violate the zero torque calibration requirement. Other dominant variable terms include high and low vehicle speed, very positive acceleration, and positive d/dt of throttle position, all of which can force a 'No' decision. Other rules may used to insure that a zeroing operation is not performed. The other side of the rule set involves determining the best time to perform zeroing. In an actual implementation these rules would be tuned or trained such that with typical driving patterns the algorithm would provide just enough zeroing operations to maintain system accuracy. In this way, the algorithm picks the best times to perform the operation and there is less of a chance that the driver will notice an event. This tuning could be also be adaptive in the vehicle such that the algorithm adjusts the rule scaling to maintain a certain frequency of 'yes' answers to the zeroing question. While the above are sample decision rules, such may be modified by those skilled in the art according to their requirements.

While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. A method for zeroing a vehicle power train torque sensor which comprises:
    a) providing a vehicle having a power train including an engine and/or a transmission, and a torque sensor connected at a position along the power train which torque sensor measures the torque transmitted at that position in the power train;
    b) determining when a zero or near zero torque condition exists at the engine output and/or within the power train while the vehicle is moving;
    c) determining a torque value with the torque sensor while the vehicle is moving during the zero torque condition, and storing the determined torque value in a memory; and
    d) determining a second torque value with the torque sensor while the vehicle is moving, and adjusting the second torque value by an amount of torque value determined from step (c).

2. The method of claim 1 wherein step c) and step d) are conducted automatically.

3. The method of claim 1 wherein step (d) is subsequently repeated.

4. The method of claim 1 wherein steps (b), (c) and (d) are subsequently repeated.

5. The method of claim 1 wherein the torque value from step (c) is stored in a non-volatile memory.

6. The method of claim 4 wherein the torque value from step (c) is stored in a non-volatile memory.

7. The method of claim 1 wherein the torque sensor is connected to the engine of the vehicle and determines the torque value out of the engine.

8. The method of claim 1 wherein the torque sensor is connected to the transmission of the vehicle and determines the torque transmitted at that position in the transmission.

9. The method of claim 1 wherein the torque sensor is connected to a torque converter positioned between the engine and the transmission of the vehicle and determines the torque transmitted at that position in the torque converter.

10. The method of claim 1 wherein the torque sensor is connected to a flex plate positioned between the engine and the transmission of the vehicle and determines the torque value transferred through the flex plate.

11. The method of claim 1 wherein the torque sensor is connected to a differential positioned between the transmission and wheels of the vehicle and determines the torque transmitted at that position in the differential.

12. The method of claim 1 wherein a torque sensor is connected to the engine of the vehicle and determines the torque value of the engine output; and a torque sensor is connected to the transmission of the vehicle and determines the torque value at the output of the transmission.

13. The method of claim 1 wherein step (c) is conducted by a transmission controller shifting the vehicle transmission such that the vehicle transmission is placed into a neutral gear condition, determining a torque sensor value, and then shifting the vehicle transmission such that the vehicle transmission is placed out of a neutral gear condition.

14. The method of claim 1 wherein step (b) is conducted with a decision algorithm having as input parameters, one or more of vehicle speed, vehicle acceleration, throttle position, brake position, transmission speed, engine speed, and torque sensor output value.

15. A device for zeroing a vehicle power train torque sensor which comprises:
   a) a torque sensor which measures torque transmitted at a position along a vehicle power train;
   b) an apparatus for determining when a zero or near zero torque condition exists in the power train while the vehicle is moving;
   c) an instrument for determining a torque value with the torque sensor while the vehicle is moving during the zero torque condition, and storing the determined torque value in a memory; and
   d) an appliance for determining a second torque value with the torque sensor while the vehicle is moving, and adjusting the second torque value by an amount of torque value determined from the instrument.

16. The device of claim 15 wherein c) comprises an instrument for automatically determining a torque value with the torque sensor while the vehicle is moving during the zero torque condition, and storing the determined torque value in a memory; and d) comprises an appliance for automatically determining a second torque value with the torque sensor while the vehicle is moving, and adjusting the second torque value by an amount of torque value determined from the instrument.

17. The device of claim 15 wherein the apparatus for determining when a zero or near zero torque condition exists is responsive to one or more of vehicle speed, vehicle acceleration, throttle position, brake position, transmission speed, engine speed, and torque sensor output value.

18. The device of claim 15 wherein the instrument comprises a non-volatile memory.

19. A vehicle which comprises a power train including an engine and a transmission connected to the engine; and a device for zeroing a vehicle power train torque sensor which device comprises:
   a) a torque sensor which measures torque transmitted at a position along a vehicle power train;
   b) an apparatus for determining when a zero or near zero torque condition exists in the power train while the vehicle is moving;
   c) an instrument for determining a torque value with the torque sensor while the vehicle is moving during the zero torque condition, and storing the determined torque value in a memory; and
   d) an appliance for determining a second torque value with the torque sensor while the vehicle is moving, and adjusting the second torque value by an amount of torque value determined from the instrument.

20. The vehicle of claim 19 wherein c) comprises an instrument for automatically determining a torque value with the torque sensor while the vehicle is moving during the zero torque condition, and storing the determined torque value in a memory; and d) comprises an appliance for automatically determining a second torque value with the torque sensor while the vehicle is moving, and adjusting the second torque value by an amount of torque value determined from the instrument.

21. The vehicle of claim 19 wherein the torque sensor is connected to the engine of the vehicle and determines the output torque value of the engine.

22. The vehicle of claim 19 wherein the torque sensor is connected to the transmission of the vehicle and determines the torque value transmitted at that position in the transmission.

23. The vehicle of claim 19 wherein the torque sensor is connected to a torque converter positioned between the engine and the transmission of the vehicle and determines the torque value transmitted at that position in the torque converter.

24. The vehicle of claim 19 wherein the torque sensor is connected a differential positioned between the transmission and wheels of the vehicle and determines the torque value transmitted at that position in the differential.

* * * * *